Nov. 18, 1924.
O. F. BRINKMAN
GLARE SCREEN
Filed Aug. 6, 1923
1,515,805
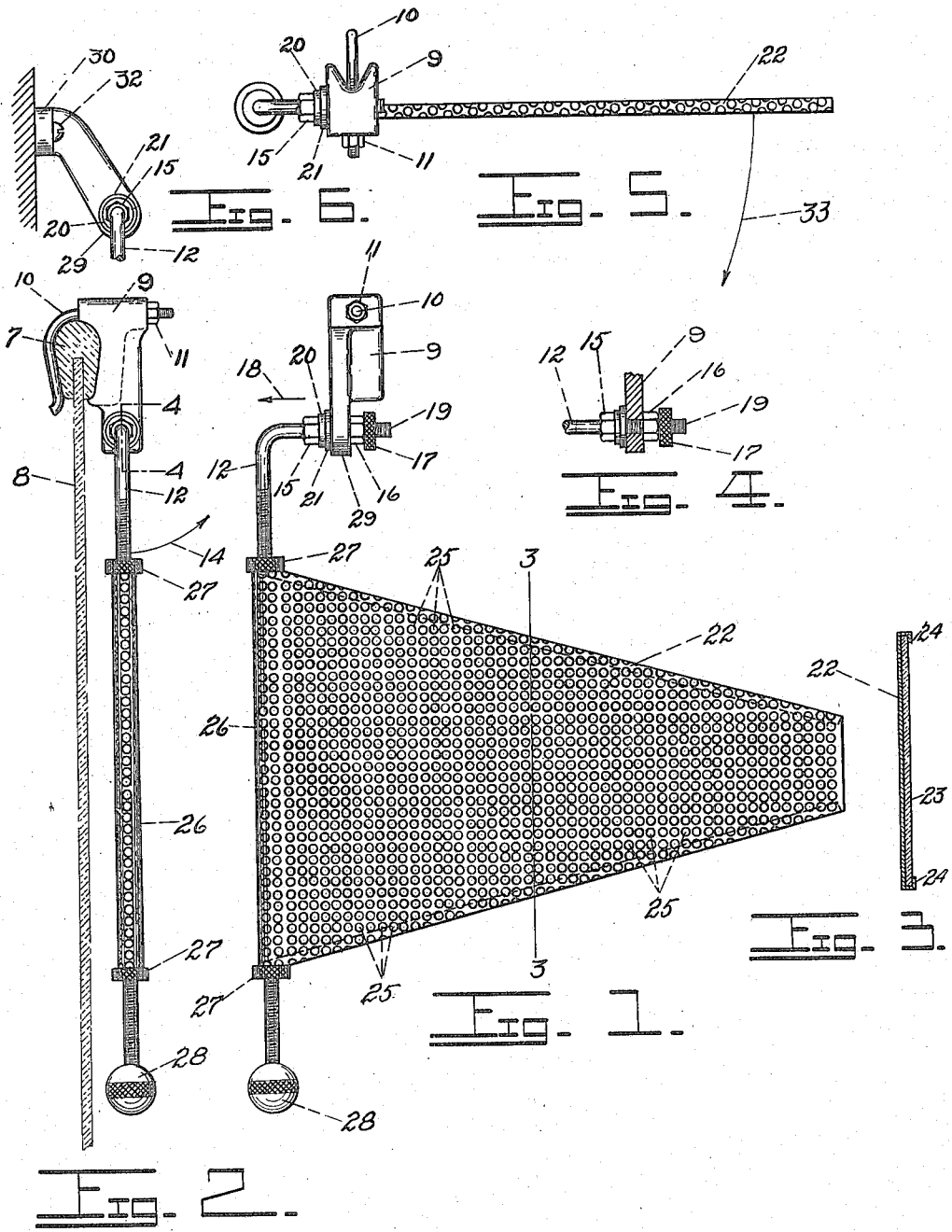
Oscar F. Brinkman.
INVENTOR
by Bernard C. Becker.
ATTORNEY Patented Nov. 18, 1924.

1,515,805

UNITED STATES PATENT OFFICE.

OSCAR F. BRINKMAN, OF LANCASTER, PENNSYLVANIA, ASSIGNOR TO ELIZABETH BRINKMAN, OF LANCASTER, PENNSYLVANIA, AND RAY T. SHERMAN, OF LEBANON, PENNSYLVANIA.

GLARE SCREEN.

Application filed August 6, 1923. Serial No. 656,007.

*To all whom it may concern:*

Be it known that I, OSCAR F. BRINKMAN, a citizen of the United States, and a resident of Lancaster, county of Lancaster, State of Pennsylvania, have invented certain new and useful Improvements in Glare Screens, of which the following is a specification.

This invention relates to glare-screens for shielding the eyes of the driver of an automobile.

The object of this invention is to provide a highly efficient glare-screen. Other objects are cheapness and simplicity consistent with durability.

This invention will be more fully understood and other objects will be apparent from the following description, taken in connection with the accompanying drawing, forming a part hereof, and in which similar numerals refer to similar parts throughout the several views.

Fig. 1, represents a front elevation of my glare-screen.

Fig. 2, is an end elevation of Fig. 1.

Fig. 3, is a sectional view taken on line 3—3 of Fig. 1.

Fig. 4 is a sectional view taken on line 4—4 of Fig. 2.

Fig. 5, is a plan view of Fig. 1.

Fig. 6, represents a bracket which may be employed for hanging the glare-screen to a wooden frame structure, for instance, the inside of an inclosed automobile body.

Shown in light broken lines in Fig. 2, is represented in sectional view, a wild shield of the type usually provided on automobiles; the numeral 7 indicates the frame thereof, and 8 the glass.

In carrying out this invention I provide a bracket 9 which is adapted to fit the average type of wind shield frames; this bracket is held in a rigid manner to the frame through the hook 10, when the nut 11 is drawn tightly home.

The hanger 12 is secured to the bracket 9 in a manner adapted to permit the same to be turned in the direction indicated by the arrow 14, and whereby it is frictionally held in a high or low position against any tendency to move through the normal vibration of the automobile. As represented in the drawing this is accomplished through the nuts 15 and 16 which are drawn to clamp the bracket 9. A knurled nut 17 is provided to lock the nut 16 against screwing loose. The nut 15 cannot screw loose for the reason that it is screwed tight in the direction indicated by the arrow 18 against the end of the thread 19. Interposed between the nut 15 and the bracket 9, are washers 20 and 21. The washer 20 may be of metal but I prefer that the washer 21 be made of a medium soft rubber to provide resiliency and smooth action in this joint. By properly adjusting the nuts 16 and 17, the frictional resistance to turning movement of the hanger 12 may be regulated.

The glare-screen proper consists of a perforated sheet metal screen 22, and a piece of glass 23; the sheet metal being bent over as shown at 24 to form a sort of casing to carry the glass. I prefer that the glass be colored, and that the perforations 25 be very small and close together; for when constructed in this manner the sheet metal is practically invisible, and at the same time is very effective in reducing the glare from an approaching head light.

As a means for securing the screen to the hanger 12, I prefer to wind the perforated sheet metal 22 into the form of a tube as shown at 26. The hanger passes through this tubular end, and is provided with two knurled nuts 27; these nuts may be drawn firmly against the ends of the tubular portion and the screen is thereby held rigid with the hanger. Through this construction the screen may be adjusted vertically by screwing the knurled nuts 27 up or down on the hanger 12.

A knob 28 is fixed to the end of the hanger 12 to form a handle through which the screen may be conveniently manipulated.

In the bracket shown in Fig. 6, the lower end 29 is the same as the lower end 29 of the bracket 9; the upper end however is provided with a flange 30, through which the same may be fixed to the automobile body through wood screws, one being shown at 32.

It is apparent that upon releasing the nuts 27, the screen may be turned on the hanger 12 in the direction indicated by the arrow 33, and may again be fixed in any position along this plane.

Having thus described my invention, what

I claim and desire to secure by Letters Patent is as follows:

1. In a glare screen, a sheet of finely perforated metal, a sheet of translucent material superposed thereon, and means for supporting said sheets adjacent the windshield of a motor vehicle.

2. In a glare screen, a sheet of finely perforated metal, a sheet of colored glass superposed thereon, and means for supporting said sheets adjacent the windshield of a motor vehicle.

3. In a glare screen, a sheet of finely perforated metal having its upper and lower edges turned over to form channels, a sheet of translucent material arranged beside said sheet of metal with the faces of said sheets contacting with each other, said sheet of translucent material being supported in said channels, and means for supporting said screen adjacent the windshield of a motor vehicle.

In testimony whereof, I affix my signature.

OSCAR F. BRINKMAN.